United States Patent [19]

Madgavkar et al.

[11] 4,382,912
[45] May 10, 1983

[54] SELECTIVE COMBUSTING OF HYDROGEN SULFIDE IN CARBON DIOXIDE INJECTION GAS

[75] Inventors: Ajay M. Madgavkar, Irvine, Calif.; Harold E. Swift, Pittsburgh, Pa.

[73] Assignee: Gulf Research & Development Company, Pittsburgh, Pa.

[21] Appl. No.: 300,886

[22] Filed: Sep. 10, 1981

[51] Int. Cl.³ .................... B01D 53/36; C01B 17/04
[52] U.S. Cl. .................... 423/224; 423/231; 423/539; 423/574 R; 423/576; 166/266
[58] Field of Search ............ 423/224, 230, 231, 539, 423/574 G, 576; 166/244 C, 266, 267

[56] References Cited

U.S. PATENT DOCUMENTS

| | | | |
|---|---|---|---|
| 1,900,751 | 3/1933 | Baehr | 423/224 |
| 2,083,894 | 6/1937 | Connolly | 423/224 |
| 2,650,154 | 8/1953 | Anderson | 423/574 G |
| 3,255,027 | 6/1966 | Talsma | 501/80 |
| 3,442,332 | 5/1969 | Keith | 166/267 |
| 3,551,102 | 1/1971 | Hettick et al. | 423/352 |
| 3,845,197 | 10/1974 | Renault et al. | 423/575 |
| 3,871,451 | 3/1975 | Brown | 166/267 |
| 3,880,986 | 4/1975 | Beavon | 423/574 |
| 3,895,101 | 7/1975 | Tsuruta | 423/539 |
| 3,909,452 | 9/1975 | Acres | 252/455 |
| 4,088,743 | 5/1978 | Hass et al. | 423/539 |
| 4,110,254 | 8/1978 | Lauder | 252/462 |

FOREIGN PATENT DOCUMENTS 1382640  2/1975  United Kingdom .

OTHER PUBLICATIONS

Harkness et al., Atmospherics Environment, 1968, vol. 2. pp. 303–320.
Steyns et al., Journal of Catalysis, 1974, vol. 35, pp. 11–17.
Erdo et al., Enhanced Oil, Gas Recovery & Improved Drilling Methods Symp. (Tulsa, 8/30/77–9/1/77) Proc. 1977, 1, C-5/1-C-5/10.
Oil & Gas Journal, Apr. 19, 1976, pp. 60–62.

*Primary Examiner*—Earl C. Thomas
*Attorney, Agent, or Firm*—Deane E. Keith; Forrest D. Stine; Donald L. Rose

[57] ABSTRACT

Hydrogen sulfide is selectively oxidized in a gas stream containing at least 20 mol percent a carbon dioxide using an iron catalyst, preferably $Fe_2O_3$ supported on a ceramic honeycomb support.

27 Claims, 1 Drawing Figure

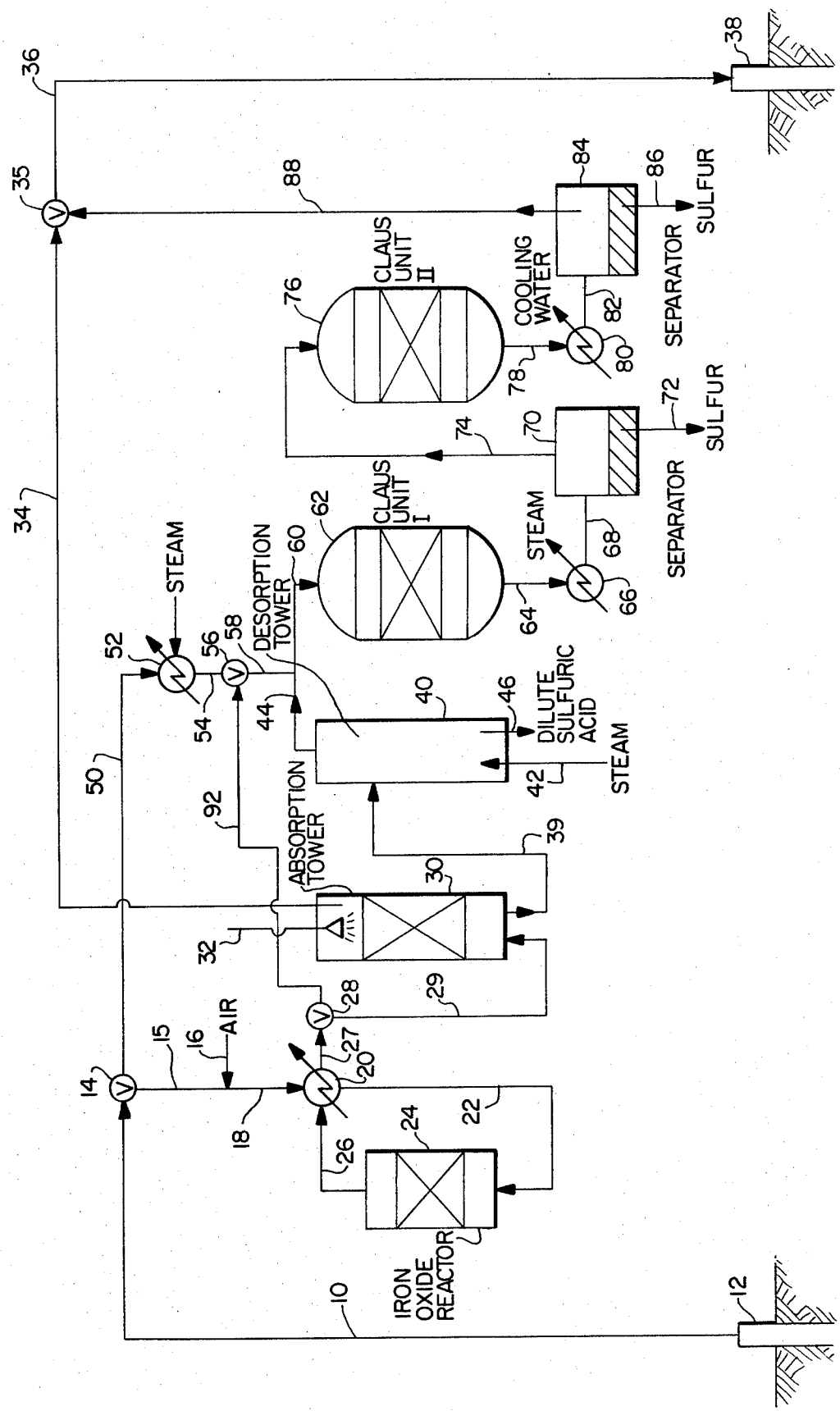

SELECTIVE COMBUSTING OF HYDROGEN SULFIDE IN CARBON DIOXIDE INJECTION GAS

FIELD OF THE INVENTION

This invention relates to a process for purifying a hydrogen sulfide-containing carbon dioxide gas stream. More particularly, this invention relates to a process for selectively removing a hydrogen sulfide contaminant from a carbon dioxide gas stream to be used for injection into oil reservoirs as a miscible flooding reagent.

BACKGROUND OF THE INVENTION

Gases have been injected into oil reservoirs to improve oil recovery, and have been utilized in both immiscible and miscible flooding techniques. Under immiscible conditions, the injected gas delays pressure declines and displaces the oil toward producing wells, while the miscible technique has the advantage of essentially eliminating the interfaces and capillary forces between the oil and the miscible agent. Various hydrocarbon gases and liquids have been used as miscible displacement agents; however, such reagents are no longer economical.

Carbon dioxide is a favorable alternative to hydrocarbon reagents, since upon initial injection the carbon dioxide is not miscible with the oil; however, because of its ability to vaporize hydrocarbon components in the oil, a miscible mixture between the reservoir oil and carbon dioxide is formed. The dissolved carbon dioxide volumetrically expands the oil and reduces its viscosity which enables the oil to flow more readily and results in better recovery.

The use of carbon dioxide has great potential for recovering oil using the miscible flooding technique; however, the realization of such potential will depend in large measure upon the availability of low cost carbon dioxide. Usual sources of carbon dioxide, such as naturally occurring deposits, flue gases from power plants and the like contain hydrogen sulfide which must be removed to be in compliance with local ordinances. Thus, for example, the acceptable hydrogen sulfide content in a carbon dioxide slug for enhanced oil recovery is about 100 ppm by volume, which is far below the usual hydrogen sulfide content in a carbon dioxide gas stream available, for example, from natural gas deposits.

The efficiency of conventional processes for hydrogen sulfide removal is significantly affected by the amount of carbon dioxide present. For example, since the conventional Claus reaction for hydrogen sulfide removal involves the reaction of hydrogen sulfide with sulfur dioxide to yield elemental sulfur and water proceeds in a reversible fashion, the carbon dioxide which functions as a diluent adversely shifts the Claus equilibrium. Accordingly, the Claus process is generally used for acid gas streams containing 20 volume percent hydrogen sulfide or greater.

Attempts to remove the hydrogen sulfide from the carbon dioxide gas stream have resulted in the undesirable production of reaction products of the carbon dioxide and hydrogen sulfide as well as between any hydrocarbon gases present to form additional impurities which are unacceptable.

SUMMARY OF THE INVENTION

Surprisingly, a process has been found whereby a hydrogen sulfide-containing carbon dioxide gas stream can be purified by selective oxidation of the hydrogen sulfide to form sulfur dioxide without concomitantly causing the reaction of carbon dioxide to form impurities such as carbonyl sulfide and carbon disulfide and without forming undesirable hydrocarbon reaction products from any light hydrocarbons present. The process of the present invention comprises contacting a hydrogen sulfide-containing carbon dioxide gas stream consisting essentially of hydrogen sulfide, from 0 to about 25 mol percent light hydrocarbons and at least 20 mol percent carbon dioxide with an iron catalyst under conditions to selectively oxidize the hydrogen sulfide to form a sulfur dioxide-containing gas stream substantially free of carbon sulfides and oxides, and tarry residue products from light hydrocarbon impurities.

The resulting sulfur dioxide-containing carbon dioxide gas stream is then treated to remove sulfur dioxide so as to recover a substantially sulfur free carbon dioxide gas stream, which can be injected into a petroleum formation for improving oil recovery.

According to one embodiment of the present invention, the sulfur dioxide along with any sulfur trioxide produced is water scrubbed to remove sulfur trioxide as sulfuric acid and to absorb the sulfur dioxide along with negligible amounts of carbon dioxide. The sulfur dioxide is desorbed from solution and blended with a hydrogen sulfide-containing feed and reacted to form elemental sulfur.

According to another embodiment of the present invention, the sulfur dioxide generated in the reaction is further reacted with additional amounts of hydrogen sulfide-containing feed gas in an aqueous phase to produce elemental sulfur.

Still another embodiment of the present invention involves only partial conversion of the hydrogen sulfide in the carbon dioxide feed gas to sulfur dioxide over the iron catalyst, and the resulting mixture of hydrogen sulfide and sulfur dioxide are reacted in liquid phase to produce elemental sulfur.

BRIEF DESCRIPTION OF THE DRAWING

The drawing is a schematic representation of the hydrogen sulfide combustion process of the present invention.

DESCRIPTION OF THE PREFERRED EMBODIMENT

As previously indicated, the process of the present invention involves contacting a hydrogen sulfide-containing carbon dioxide gas stream with an iron catalyst under conditions to selectively oxidize the hydrogen sulfide to form a sulfur dioxide-containing gas stream substantially free of carbon sulfides and oxides of any hydrocarbon present.

The carbon dioxide gas stream can be obtained from any suitable source wherein the stream contains at least 20 mol percent carbon dioxide. Suitable sources of carbon dioxide include naturally occurring carbon dioxide deposits, flue gas from power plants, flue gas from cement plants, fertilizer and chemical plant byproduct streams, and the like. Suitable carbon dioxide streams which can be treated in accordance with the present invention contain from 20 to about 99 mol percent, preferably from 75 to about 99 mol percent carbon dioxide; from 0.02 to about 20 mol percent, preferably 0.1 to about 5 mol percent hydrogen sulfide; from 0 to about 25 mol percent, preferably from 0 to about 5 mol percent light hydrocarbon gases, such as a methane fraction containing predominantly methane and minor amounts of higher hydrocarbons, such as ethane and propane; and from 0 to about 80 mol percent, preferably from 0 to 5 to about 25 mol percent nitrogen. The foregoing ranges include amounts normally found in both naturally occurring carbon dioxide gas streams and combustion flue gas streams high in nitrogen.

Any suitable iron catalyst can be used for oxidation of the hydrogen sulfide to sulfur dioxide. Preferably, the iron catalyst is sulfided or unsulfided iron oxide, for example, $Fe_2O_3$ (hematite), FeO (wuestite) or $Fe_3O_4$ (magnetite) or iron sulfide, for example, FeS, $Fe_2S_3$, or $FeS_2$, or mixtures thereof. In addition, a promoter such as cobalt, molybdenum, chromium, manganese, nickel, tungsten, or the like may be used.

The catalyst may be supported if desired. A suitable support for the catalyst of this invention can be any of the refractory oxide supports well known in the art, such as those prepared from alumina, silica, magnesia, thoria, titania, zirconia, silica-aluminas, silica-zirconias, magnesia-aluminas, and the like. Other suitable supports include the naturally occurring clays, such as diatomaceous earth. Additional desirable supports for use herein are the more recently developed corrugated ceramic materials made, for example, from alumina, silica, magnesia, and the like. An example of such material is described in U.S. Pat. No. 3,255,027, the disclosure of which is hereby incorporated by reference, and is commercially available from E. I. duPont de Nemours & Company as Torvex. More recently, metallic monoliths have been fabricated as catalyst supports and these may be used to support the catalytic material. An example of these supports is Fecralloy manufactured by Matthey Bishop, Inc. under U.S. Pat. Nos. 3,298,826 and 3,920,583, which are hereby incorporated by reference.

An especially preferred catalyst of the present invention comprises $Fe_2O_3$ on a support consisting essentially of an inert rigid porous refractory ceramic honeycomb having applied thereto a first adherent catalytically active refractory metal oxide coating containing at least 50 weight percent alumina. Such catalyst supports are disclosed in U.S. Pat. No. 3,909,452, the disclosure of which is hereby incorporated by reference.

Suitable amounts of the catalytic iron compound of the present invention comprise about 0.5 to about 30, preferably between about 2 to about 10 weight percent based upon the total weight of the catalyst. Similarly, if a promoter is utilized, suitable amounts include, for example less than 5 weight percent, preferably less than one weight percent based upon total catalyst weight.

Suitable temperatures for oxidation of the hydrogen sulfide include from about 300° F. (149° C.) to about 900° F. (482° C.), preferably from about 400° F. (204° C.) to about 700° F. (371° C.), with an especially preferred range being between about 550° F. (288° C.) to about 650° F. (343° C.). Suitable pressures include between about 0.5 and about 150 atmospheres, preferably between about 1 and about 50 atmospheres. Oxidation of the hydrogen sulfide is conducted in the presence of any suitable oxygen containing gas, such as air. The feed gas is passed through the oxidation reactor at a space velocity of from about 1,000 to about 100,000 $hour^{-1}$, preferably between about 20,000 and about 80,000 $hour^{-1}$.

The resulting hydrogen sulfide content of the purified carbon dioxide injection gas is less than about 100 ppm, preferably below about 50 ppm, with below about 20 ppm being especially preferred.

Referring now to the drawing, a feed gas stream 10 is withdrawn from well 12, said gas stream containing from 40 to about 90 mol percent carbon dioxide, 0.1 to 5 mol percent hydrogen sulfide, 5 to 25 mol percent nitrogen, and 2 to 5 mol percent methane gas. The gas stream in line 10 is passed through three-way valve 14 to line 15 and is admixed with a stoichiometric quantity of air supplied by line 16. The admixture in line 18 is passed through heat exchange zone 20 and line 22 to reaction zone 24 containing a supported iron oxide catalyst. The admixture is burned in reactor 24 at a temperature of about 600° F. (316° C.) and a space velocity in the range of, for example, 20,000 to 80,000 $hr^{-1}$. The hydrogen sulfide is oxidized to form approximately 80 to 85 mol percent sulfur dioxide with the remainder being sulfur trioxide.

Surprisingly, the small quantity of hydrocarbons present are not oxidized, and no reaction takes place between the carbon dioxide and the hydrogen sulfide. The resulting stream containing the sulfur dioxide and sulfur trioxide is passed from reactor 24 by means of line 26 through heat exchange zone 20, where the incoming gas mixture is heated and the combusted stream cooled. Next, the cooled mixture in line 27 is passed by means of three-way valve 28 and line 29 to scrubber 30 wherein the gas stream is countercurrently contacted with water introduced by means of line 32. The gas stream is water scrubbed to remove sulfur trioxide as sulfuric acid, while the sulfur dioxide is almost completely absorbed into the water along with negligible amounts of carbon dioxide since the ratio of solubilities of sulfur dioxide to carbon dioxide in water is roughly 66:1 at 0° C. Additionally, any hydrocarbons present are sparingly soluble in water, thus, the resulting aqueous stream 39 contains mainly sulfur dioxide and sulfuric acid. Preferably, water introduced by line 32 into scrubber 30 has a pH in the range of 5.5 to 7.5. Thus, ordinary cooling water can be employed. However, if the water source has a more acidic pH, alkaline solutes such as $NaHCO_3$, $Na_2CO_3$, caustic or lime may be added to improve water selectivity. The sulfur dioxide-free carbon dioxide injection gas is withdrawn from scrubber 30 by means of line 34 and passed via three-way valve 35 and line 36 to well 38 where it is injected into an oil formation. The carbon dioxide stream contains a maximum of 100 ppm hydrogen sulfide and preferably less than 20 ppm hydrogen sulfide.

The aqueous stream 39 is passed to desorption tower 40 wherein it is passed countercurrent to a stream of steam introduced at line 42 resulting in the desorption of the sulfur dioxide from the aqueous stream and removal thereof by means of line 44. Dilute sulfuric acid is withdrawn from desorption tower 40 by means of line 46. The sulfur dioxide containing stream is admixed with a hydrogen sulfide-containing carbon dioxide stream introduced at line 50. A suitable hydrogen sulfide-containing stream is a portion of the feed which can be passed from well 12, line 10, valve 14, line 50 through heat exchange zone 52 wherein the hydrogen sulfide-containing stream is heated to a temperature of between about 400° and about 750° F., preferably between 500° and about 650° F. The heated hydrogen sulfide-containing stream is then passed by means of line 54, valve 56 and line 58 for admixture with the sulfur dioxide-containing stream 44, and the admixture is passed by means of line 60 to a Claus-type reaction zone 62 for conversion into elemental sulfur according to the reaction:

$$2H_2S + SO_2 \rightarrow 3S + 2H_2O \qquad (I)$$

Claus reaction zone 62 may be a conventional gaseous phase Claus reactor, or a liquid phase Claus reactor such as that described, for example, in U.S. Pat. No. 3,845,197, which is hereby incorporated by reference. The elemental sulfur containing stream is withdrawn from reaction zone 62 by means of line 64 and passed to heat exchange zone 66 wherein it is heated to a temperature of between 250° F. (121° C.) and about 700° F. (371° C.). The heated stream is then passed by means of line 68 to separator 70 wherein the sulfur is recovered by means of line 72.

Unreacted hydrogen sulfide and sulfur dioxide are withdrawn from separator 70 by means of line 74 and passed to a second Claus-type reaction zone 76, which is in series with the first reaction zone 62. The reaction effluent is withdrawn by means of line 78 and passed through heat exchange zone 80 to cool the reaction mixture and line 82 to separator 84 wherein the elemental sulfur is discharged by means of line 86. The resulting hydrogen sulfide and sulfur dioxide-free carbon dioxide gas stream is withdrawn from separator 84 and passed by means of line 88 and three-way valve 35 for injection into well 38.

Alternatively, the process can be conducted without using absorber 30 and desorber 40. Thus, the effluent from combustion zone 24 can be passed by means of line 26, heat exchanger 20, line 27, valve 28, line 92 and valve 56 for admixture with the hydrogen sulfide-containing stream in line 54. The admixture is then passed by means of lines 58 and 60 to reaction zone 62 as before. In this way, absorption zone 30 and desorption zone 40 are eliminated from the process, and the sulfur dioxide-containing reactor effluent from zone 24 is reacted directly with hydrogen sulfide to form elemental sulfur in reaction zones 62 and 76.

According to still another embodiment of the present invention, the hydrogen sulfide-containing feed gas in line 10 is admixed with less than a stoichiometric amount of air added in line 16 and the resulting admixture is likewise passed through reaction zone 24 containing the supported iron oxide catalyst. However, the oxygen in reaction zone 24 is present only in sufficient quantity to convert about one-third of the hydrogen sulfide present to sulfur dioxide according to the following reaction:

$$3H_2S + O_2 \rightarrow 2H_2S + SO_2 \qquad (II)$$

With an oxygen deficient atmosphere, the amount of sulfur trioxide formed is minimal and the reaction effluent in line 26 is passed directly by means of heat exchanger 20, line 27, valve 28, line 92, valve 58, line 59 and line 60 to reaction zone 62 without any addition of hydrogen sulfide-containing feed from line 54, since the stream in line 62 contains the appropriate amount of hydrogen sulfide to react with the sulfur dioxide to form elemental sulfur according to reaction (I), as before. The reaction effluent is then treated as before through the separators and additional reaction zone 76.

EXAMPLE

The following experiments demonstrate the high degree of selectivity of the process of the present invention and the complete conversion of hydrogen sulfide to sulfur dioxide.

The reactor used in the following experiments was a one-inch I.D. forged steel unit which was heavily insulated to give adiabatic reaction conditions. The catalysts consisted of three one-inch iron oxide-treated monoliths wrapped in a thin sheet of a refractory material (Fiberfrax, available from Carborundum Co.). Well insulated preheaters were used to heat the gas stream before it was introduced into the reactor. The temperature was measured directly before and after the catalyst bed to provide the inlet and outlet temperatures. An appropriate flow of preheated carbon dioxide and air was passed over the catalyst until the desired feed temperature was obtained.

At this point hydrogen sulfide and/or the hydrocarbon blend was introduced and combustion was permitted to proceed until steady state conditions were reached. The feed gas stream contained 4.10 mol percent hydrogen sulfide, 1.30 mol percent hydrocarbons (0.89 mol percent methane, 0.23 mol percent ethane and 0.18 mol percent propane), and 94.60 mol percent carbon dioxide, on an air-free basis.

The preparation of the iron oxide monolith catalyst is now described. A Torvex monolith was used as the support. The Torvex support, a product of E. I. duPont de Nemours and Co. was a mullite ceramic in the shape of a honeycomb having a coating of high surface area alumina, designated RML-2588. The support was cut into one inch diameter by one inch deep pieces, blown free of dust and weighed. The support material was impregnated with an aqueous solution containing ferric nitrate at a concentration of 0.7 grams of $Fe(NO_3)_3 \cdot 9H_2O$ per gram of solution by soaking at 25° C. for 25 minutes with periodic mixing. The catalysts were drained, blown free of excess solution and blotted on paper. The wet monoliths were placed into a gassing tube and treated with gaseous ammonia for 30 minutes. After purging with air, the catalysts were dried overnight at 120° C. and calcined at 1000° F.

The catalysts were then blown free of dust, weighed, soaked in the ferric nitrate solution, gassed, dried and calcined twice more. Calculated from weight gain, the catalysts contained 9.32 percent $Fe_2O_3$.

A series of experiments were conducted to demonstrate the selectivity of the catalysts of the present invention. In all of the experiments, combustion of the hydrogen sulfide was complete. The amount of air used was roughly 20 percent excess over that needed for complete oxidation of hydrogen sulfide to sulfur dioxide. The reaction conditions are indicated in Table I:

TABLE I

| Run | GHSV (Hr) | Inlet Temp. °F. (°C.) | Outlet Temp. °F. (°C.) | Gas Composition at the End of Run (Mole %, Dry Basis) | | | | | | |
|---|---|---|---|---|---|---|---|---|---|---|
| | | | | Ar + $O_2$ | $N_2$ | $CH_4$ | $C_2H_6$ | $C_3H_8$ | $CO_2$ | $SO_2$ | $SO_3$ |
| 1 | 20 000 | 600(316) | 817(436) | 3.04 | 26.75 | 0.95 | 0.20 | 0.22 | 65.88 | 2.26 | 0.70 |
| 2 | 30 000 | 600(316) | 916(491) | 2.89 | 24.49 | 0.72 | 0.16 | 0.22 | 66.59 | 2.40 | 0.53 |
| 3 | 30 000 | 600(316) | 945(507) | 2.81 | 26.98 | 0.72 | 0.14 | 0.16 | 66.21 | 2.37 | 0.61 |
| 4 | 40 000 | 598(314) | 983(528) | 2.11 | 25.58 | 0.74 | 0.13 | 0.19 | 68.42 | 2.10 | 0.73 |

TABLE I-continued

| Run | GHSV (Hr) | Inlet Temp. °F. (°C.) | Outlet Temp. °F. (°C.) | Gas Composition at the End of Run (Mole %, Dry Basis) | | | | | | | |
|---|---|---|---|---|---|---|---|---|---|---|---|
| | | | | Ar + O$_2$ | N$_2$ | CH$_4$ | C$_2$H$_6$ | C$_3$H$_8$ | CO$_2$ | SO$_2$ | SO$_3$ |
| 5 | 40 000 | 597(314) | 1015(546) | 1.91 | 25.76 | 0.63 | 0.10 | 0.18 | 68.57 | 2.03 | 0.82 |
| 6 | 50 000 | 600(316) | 1026(552) | 2.18 | 25.57 | 0.63 | 0.11 | 0.17 | 68.51 | 2.02 | 0.81 |
| 7 | 50 000 | 600(316) | 1031(555) | 2.25 | 25.23 | 0.61 | 0.16 | 0.17 | 68.73 | 1.86 | 0.93 |
| 8 | 60 000 | 603(317) | 1141(616) | 1.38 | 25.82 | 0.62 | 0.12 | 0.15 | 69.95 | 2.16 | 0.70 |
| 9 | 60 000 | 600(316) | 1171(633) | 0.81 | 26.31 | 0.65 | 0.13 | 0.14 | 69.05 | 2.11 | 0.80 |
| 10 | 70 000 | 602(317) | 1038(559) | 2.26 | 24.64 | 0.73 | 0.14 | 0.18 | 69.32 | 2.32 | 0.41 |
| 11 | 70 000 | 600(316) | 1065(574) | 2.27 | 25.73 | 0.58 | 0.12 | 0.18 | 68.27 | 2.07 | 0.78 |
| 12 | 80 000 | 600(316) | 1087(586) | 2.53 | 28.74 | 0.63 | 0.11 | 0.14 | 64.67 | 1.63 | 1.55 |

As seen from the data in Table I, there was no hydrogen sulfide in the product gas thus indicating complete conversion to sulfur dioxide. Additionally, none of the hydrocarbons combusted, nor was any carbonyl sulfide or carbon disulfide formed.

The effect of space velocity upon product distribution for the foregoing experiments is shown in Table II:

TABLE II

| Run | H$_2$S Conversion Percent | SO$_2$ Conversion Percent | SO$_3$ Selectivity Percent | Elemental Sulfur Percent |
|---|---|---|---|---|
| 1 | 100 | 76.32 | 23.68 | <1 |
| 2 | 100 | 82.07 | 17.93 | <1 |
| 3 | 100 | 79.43 | 20.53 | <1 |
| 4 | 100 | 74.30 | 25.70[1] | <1 |
| 5 | 100 | 71.26 | 28.74 | <1 |
| 6 | 100 | 71.43 | 28.57 | <1 |
| 7 | 100 | 66.43 | 33.57 | <1 |
| 8 | 100 | 75.73 | 24.27 | <2 |
| 9 | 100 | 72.38 | 27.62 | <2 |
| 10 | 100 | 84.78 | 15.22 | <3 |
| 11 | 100 | 72.65 | 27.35 | <3 |
| 12 | 100 | — | 48.84 | <3 |

[1]By difference, Percent SO$_3$ = Percent H$_2$S conversion − Percent SO$_2$

Surprisingly, it is seen that the space velocity had little effect upon the relative amounts of sulfur dioxide and sulfur trioxide produced. Roughly 75–80% of hydrogen sulfide was converted into sulfur dioxide, while the remainder was further oxidized to sulfur trioxide.

Next, experiments were conducted using the catalyst and reactor previously used, but with stoichiometric amounts of oxygen to convert all of the hydrogen sulfide to sulfur dioxide. The conditions utilized and results of these runs are set forth in Table III.

TABLE III

| Run No. | GHSV (Hr) | Inlet Temp. °F. (°C.) | Outlet Temp. °F. (°C.) | Gas Composition at the End of Run (Mole %, Dry Basis) | | | | | | | |
|---|---|---|---|---|---|---|---|---|---|---|---|
| | | | | Ar + O$_2$ | N$_2$ | CH$_4$ | C$_2$H$_6$ | C$_3$H$_8$ | CO$_2$ | SO$_2$ | SO$_3$ |
| 13 | 20 000 | 605(318) | 840(449) | 0.43 | 18.48 | 0.89 | 0.19 | 0.23 | 76.50 | 2.46 | 0.82 |
| 14 | 20 000 | 603(317) | 834(446) | 0.40 | 19.43 | 0.87 | 0.21 | 0.24 | 75.41 | 2.45 | 0.99 |
| 15 | 30 000 | 600(316) | 934(501) | 0.24 | 19.03 | 0.81 | 0.18 | 0.22 | 76.73 | 2.77 | 0.50 |
| 16 | 35 230 | 602(317) | 963(517) | 0.23 | 18.59 | 0.78 | 0.15 | 0.23 | 76.73 | 2.77 | 0.52 |
| 17 | 50 000 | 600(316) | 1026(552) | 0.25 | 18.18 | 0.67 | 0.19 | 0.22 | 77.27 | 2.58 | 0.64 |
| 18 | 60 000 | 600(316) | 1033(556) | 0.24 | 17.87 | 0.69 | 0.16 | 0.19 | 77.68 | 2.69 | 0.48 |
| 19 | 60 000 | 597(314) | 1038(559) | 0.24 | 17.67 | 0.65 | 0.21 | 0.20 | 77.90 | 2.57 | 0.56 |
| 20 | 70 460 | 600(316) | 1040(560) | 0.25 | 17.39 | 0.67 | 0.16 | 0.20 | 78.25 | 2.48 | 0.60 |

Surprisingly, significant amounts of sulfur trioxide were produced even with lower oxygen concentrations. Roughly 15–20 percent of the hydrogen sulfide was further oxidized to sulfur trioxide while the remainder formed sulfur dioxide and small quantities of elemental sulfur as shown in Table IV, below.

TABLE IV

| Run No. | H$_2$S Conversion (Percent) | SO$_2$ Selectivity (Percent) | SO$_3$ Selectivity[1] (Percent) | Elemental Sulfur (Percent) |
|---|---|---|---|---|
| 13 | 100 | 75.08 | 24.92 | <1 |
| 14 | 100 | 71.35 | 28.65 | <1 |
| 15 | 100 | 85.23 | 14.77 | <1 |
| 16 | 100 | 84.19 | 15.81 | <1 |
| 17 | 100 | 80.12 | 19.88 | <1 |
| 18 | 100 | 81.93 | 18.07 | <2 |
| 19 | 100 | 84.77 | 15.23 | <2 |
| 20 | 100 | 80.32 | 19.68 | <3 |

[1]By difference, Percent SO$_3$ = Percent H$_2$S conversion − Percent SO$_2$.

As seen from the results in Tables III and IV, 100% of the hydrogen sulfide was converted to sulfur dioxide and no organic sulfur compounds were formed nor were any of the hydrocarbons combusted.

What is claimed is:

1. A process for purifying a hydrogen sulfide-containing carbon dioxide gas stream, which comprises contacting said gas stream, which consists essentially of hydrogen sulfide, from 0 to about 25 mol percent light hydrocarbons and at least 20 mol percent carbon dioxide, with an iron catalyst under conditions to selectively oxidize said hydrogen sulfide to form a sulfur dioxide-containing gas stream substantially free of organic sulfur compounds.

2. The process of claim 1 wherein said selective oxidation is conducted at a temperature in the range of 300° to about 900° F. (149° to 482° C.).

3. The process of claim 2 wherein said selective oxidation temperature is in the range of 400° to about 800° F. (204° to 427° C.).

4. The process of claim 1 wherein said oxidation reaction is conducted at a pressure in the range of 0.5 to about 150 atmospheres.

5. The process of claim 4 wherein said pressure is in the range of 1 to about 50 atmospheres.

6. The process of claim 1 wherein said hydrogen sulfide containing carbon dioxide stream consists essentially of from 0.02 to about 20 mol percent hydrogen sulfide, from 0 to about 25 mol percent light hydrocarbons, from 20 to about 99 mol percent carbon dioxide and from 0 to about 80 mol percent nitrogen.

7. The process of claim 6 wherein the hydrogen sulfide-containing stream contains from 0.1 to about 5 mol percent hydrogen sulfide, from 0 to 5 mol percent light hydrocarbons, from 75 to about 99 mol percent carbon dioxide and from 0 to about 25 mol percent nitrogen.

8. The process of claim 1 wherein said iron catalyst comprises a support and between about 0.5 to about 30 weight percent iron compound.

9. The process of claim 8 wherein said iron catalyst comprises between about 2 to about 10 weight percent iron compound.

10. The process of claim 1 wherein said iron catalyst comprises iron oxide, iron sulfide or mixtures thereof.

11. The process of claim 10 wherein said iron oxide is $Fe_2O_3$, $FeO$, or $Fe_3O_4$.

12. The process of claim 11 wherein said iron oxide is $Fe_2O_3$.

13. The process of claim 10 wherein said iron sulfide is $FeS$, $FeS_2$, or $Fe_2S_3$.

14. The process of claim 10 wherein said catalyst is supported on a refractory oxide support.

15. The process of claim 14 wherein said support consists essentially of an inert, rigid porous refractory ceramic honeycomb having applied thereto an adherent, catalytically active, refractory metal oxide coating.

16. The process of claim 15 wherein said refractory metal oxide coating is alumina.

17. The process of claim 1 wherein said sulfur dioxide containing gas stream is treated to remove sulfur dioxide and recover a substantially sulfur-free carbon dioxide stream.

18. The process of claim 17 wherein said sulfur dioxide-containing stream is passed through absorption and desorption zones, in sequence, to separate sulfur dioxide from the carbon dioxide, and reacting the sulfur dioxide with hydrogen sulfide to form elemental sulfur.

19. The process of claim 17 wherein said sulfur dioxide-containing stream is admixed with a hydrogen sulfide-containing stream and said sulfur dioxide and said hydrogen sulfide in said admixture are reacted to form elemental sulfur.

20. The process of claim 17 wherein said hydrogen sulfide is oxidized using less than a stoichiometric quantity of oxygen and the reaction effluent comprising hydrogen sulfide and sulfur dioxide are further reacted to form elemental sulfur.

21. The process of claim 1 wherein the sulfur dioxide containing gas stream is treated to remove sulfur dioxide and the resulting carbon dioxide containing stream is passed to an underground formation as an injection gas for recovery of petroleum deposits.

22. The process of claim 1 wherein said hydrogen sulfide-containing carbon dioxide feed gas stream is obtained from a naturally occurring gas deposit.

23. The process of claim 17 wherein said substantially sulfur-free carbon dioxide stream contains between 20 to about 100 ppm hydrogen sulfide.

24. The process of claim 17 wherein said substantially sulfur-free carbon dioxide stream contains below about 20 ppm hydrogen sulfide.

25. The process of claim 1 wherein said hydrogen sulfide-containing carbon dioxide gas stream contains a methane fraction containing predominantly methane and minor amounts of higher hydrocarbons.

26. A process for purifying a hydrogen sulfide-containing carbon dioxide gas stream, which comprises contacting said gas stream, which consists essentially of from about 0.02 to about 20 mol percent hydrogen sulfide, from 20 to about 99 mol percent carbon dioxide and light hydrocarbon impurities comprising a methane fraction, with an iron oxide catalyst supported on an inert, rigid porous refractory metal ceramic honeycomb having applied thereto an adherent alumina coating, at a temperature in the range of 400° to about 800° F. (204° to 427° C.) at a pressure of 1 to about 50 atmospheres in the presence of an oxygen-containing gas to form a sulfur dioxide-containing gas stream containing less than 100 ppm hydrogen sulfide and substantially free of carbon sulfides, carbon oxides and tarry residence products from said light hydrocarbon impurities.

27. The process of claim 26 wherein said iron oxide is $Fe_2O_3$ and said catalyst contains less than one weight percent of a promoter based upon total catalyst weight.

* * * * *